United States Patent [19]

Weber

[11] 4,209,430
[45] Jun. 24, 1980

[54] TREATMENT OF INORGANIC PIGMENTS

[75] Inventor: Leon Weber, Baltimore, Md.

[73] Assignee: SCM Corporation, New York, N.Y.

[21] Appl. No.: 963,301

[22] Filed: Nov. 24, 1978

[51] Int. Cl.² .................. C08F 10/02; C08F 10/06; C08K 9/04

[52] U.S. Cl. .................. 260/23 H; 106/300; 106/308 F; 106/308 M; 106/309; 260/30.6 R; 260/42.14; 260/42.44; 260/42.45

[58] Field of Search .................. 106/308 F, 300, 309, 106/308 M; 260/23 H, 30.6 R, 42.14, 42.44, 42.45

[56] References Cited

U.S. PATENT DOCUMENTS

| | | | |
|---|---|---|---|
| 3,343,974 | 9/1967 | Faulkner et al. | 106/300 |
| 3,345,187 | 10/1967 | Binnis | 260/42.14 |
| 3,436,239 | 4/1969 | Feld | 106/300 |
| 3,449,271 | 6/1969 | O'Connor et al. | 106/300 |
| 3,617,323 | 11/1971 | Riegler | 106/300 |
| 3,713,859 | 1/1973 | Hoover et al. | 106/309 |
| 3,904,565 | 9/1975 | Yoshiura et al. | 260/23 H |
| 3,946,134 | 3/1976 | Sherman | 106/309 |
| 4,125,500 | 11/1978 | Mayer et al. | 260/23 H |

FOREIGN PATENT DOCUMENTS 429553  5/1935  United Kingdom ............... 106/308 F

*Primary Examiner*—Ronald W. Griffin
*Attorney, Agent, or Firm*—Merton H. Douthitt; Jerry K. Mueller, Jr.

[57] ABSTRACT

Improved inorganic pigments, such as pigmentary titanium dioxide, are made by treating such pigments with a treating agent comprising the reaction product of a phosphorylating agent and a polyolefin.

27 Claims, No Drawings

TREATMENT OF INORGANIC PIGMENTS

BACKGROUND OF THE INVENTION

The present invention relates to treated inorganic pigments used in thermoplastic formulations.

Often such pigments are incompatible with the thermoplastic binders in which they are incorporated. Such incompatibility can be manifested by failure of the pigment to uniformly disperse in the binder, for example. Pigmentary inorganic pigments, such as pigmentary titanium dioxide, generally do not exhibit the desired pigmentary properties in the binder due to such incompatibility and can interact with phenolic anti-oxidants in polyethylene, for example, causing yellowing of the pigmented polyethylene product.

One aspect of the invention is a treated inorganic pigment which is resistant to agglomeration under storage conditions and disperses evenly and uniformly in various binders into which it is incorporated. Another aspect of the invention is a treated pigmentary titanium dioxide pigment which imparts excellent pigmentary properties to the binder. A further aspect of the invention is a method for suppressing yellowing in polyethylene or like polyolefin plastics by utilizing the disclosed treating agent either as a stabilizer added to the polyethylene or as a treating agent applied to the titanium dioxide pigment incorporated into the polyethylene. These and a variety of other aspects of the invention will become apparent from the following description of the invention.

BROAD STATEMENT OF THE INVENTION

The present invention is a process for treating inorganic pigment and the resulting treated pigment. Such process comprises applying to said pigment a phosphorylated polyene in a proportion to provide at least about 0.02% phosphorus content by weight of said pigment. The phosphorylated polyene is the reaction product of a phosphorylating agent and a polyene (a polyolefinically unsaturated compound). The novel inorganic pigment so-treated preferably is pigmentary titanium dioxide. Another aspect of the present invention is a process for suppressing yellowing in thermoplastic polyolefins containing a phenolic anti-oxidant and TiO$_2$ pigment. Such process comprises adding to said polyolefin an effective proportion of said treating agent directly as an additive or as a coating on said TiO$_2$ pigment.

DETAILED DESCRIPTION OF THE INVENTION

The instant treating agent for treating inorganic pigments is a phosphorylated polyene. For present purposes, "phosphorylation" comprehends the addition of a phosphoryl group to the olefinic unsaturation (or its equivalent) of an aliphatic polyunsaturated compound (polyene). Polyene comprehends a (poly)unsaturated olefin, optionally in admixture with a monounsaturated olefin and/or in admixture with a saturated olefin. Suitable olefins can be linear or branched acyclic structures or can be cyclic structures. Additionally, substitution is permitted on the polyene such as, for example, carboxyl, carboxylic acid ester, halide, ether, sulfate, aromatic, amino, and the like and mixtures thereof.

Desirably, the olefin will be at least a C$_{10}$ olefin so that the phosphorylated polyene will possess the requisite stability and nonvolatility to remain substantially intact on the inorganic pigment under processing conditions and in ultimate curable binder formulations for which the treated inorganic pigment is intended. Preferable polyenes include polyunsaturated higher fatty (fat-forming) acids usually having a chain length of at least C$_{10}$ and preferably of C$_{18}$ and higher (e.g. up to C$_{28}$), such as linoleic acid, linolenic acid and the like. Such polyunsaturated fatty acids also can be in admixture with monounsaturated higher fatty acids such as oleic acid, and with saturated higher fatty acids such as stearic acid and the like. Further, phosphorylated fatty acids derivatives are included as useful treating agents. Such derivatives include fatty acid esters such as alkyl fatty acid esters, fatty acid amides, and the like. The fatty acids can be derived from vegetable or glyceride oil sources, from tall oil, or mixtures thereof for present purposes.

A wide variety of phosphorylation reactions have been reported in the literature and such reactions generally are suitable for preparing the phosphorylated polyenes of this invention. One procedure utilizes a Friedel-Crafts catalyzed reaction such as shown in the following references: E. Jungermann and J. J. McBride, *J. Org. Chem.* 26, 4182 (1961); E. Jungermann, J. J. McBride, R. Clutter and A. Mais, *J. Org. Chem.* 27, 606 (1962); J. J. McBride, E. Jungermann, J. V. Killheffer and R. J. Clutter, *J. Org. Chem.* 27, 1833 (1962); E. Jungermann, B. C. Brown and J. J. McBride, *J. Am. Oil Chem. Soc.* 40, 41 (1963); E. Jungermann and H. E. Reich, *Ind. Eng. Chem., Prod. Res. Develop.* 2 (4), 315 (1963); E. Jungermann and R. J. Clutter, British Pat. No. 904,474 (Aug. 29, 1962). Other procedures utilize other catalysts or initiators supplied by peroxides (R. Sasin, R. A. DeMauriac, E. J. Leopold, H. B. Gordon and G. S. Sasin, *J. Am. Oil. Chem. Soc.* 42, 134–136 [1965]); perchloryl fluoride [S. V. Fridland, N. V. Dmitrieva and I. V. Vigalok, *Zh. Obshch. Khim.* (Engl. Trans.) 44 (6), 1261 (1974)]; and photochemical means, [J. R. Little and P. F. Hartmann, *J. Am. Chem. Soc.* 88, 96 (1966)]. The disclosures of these references are expressly incorporated herein by reference.

Another useful phosphorylated polyene comprises a diphosphonic acid or diphosphonic acid ester of paramenthane such as is disclosed in commonly-assigned application Ser. No. 925,165, filed July 13, 1978, now abandoned, of David R. Battiste. Such compounds can be represented conventionally by the following structures:

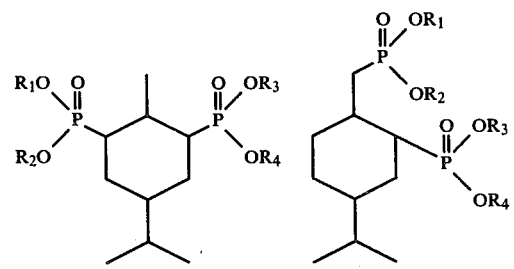

where R$_1$, R$_2$, R$_3$, and R$_4$, independently, are hydrogen or a C$_{1-10}$ alkyl group.

The proportion of treating agent used to treat the inorganic pigment is based on the phosphoryl (calculated as elemental phosphorus) content of the treating agent and may depend upon the particular method of synthesizing the treating agent as the examples will demonstrate. Broadly, less treating agent will be required for those treating agents having a higher phosphoryl content and more treating agent will be required for treating agents having a lower phosphoryl content. Broadly, the proportion of treating agent should be adjusted to provide at least about 0.02% phosphorus content by weight of the inorganic pigment treated and advantageously between about 0.04 and 0.1%. This translates with the preferred treating agents to about 0.1 to 1.0% treating agent by weight of the inorganic pigment and preferably between about 0.3 and 0.7%.

Inorganic pigments (or mineral pigments) for the present invention advantageously are opacifying inorganic pigments and preferable among these is pigmentary titanium dioxide. However, other inorganic pigments can be advantageously treated according to the present invention though they are nonopacifying pigments. Inorganic pigments for present purposes is a broad term defining ingredients which are particulate and substantially nonvolatile in use, and includes those ingredients typically labeled as inerts, extenders, fillers or the like in the paint and plastic trade.

Representative inorganic pigments include by way of illustration and not limitation: clays such as kaolin clay, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fiber, glass powder, glass spheres, and the like and mixtures thereof.

Titanium dioxide pigments include rutile and anatase titanium dioxide and generally have an average particle size of less than 5,000 Å; and typically between about 1,000 and 5,000 Å. The titanium dioxide pigments also may contain ingredients added thereto to improve the durability characteristics or other properties of the pigment. Thus, the $TiO_2$ pigments may contain hydrous oxides such as silica, alumina, tin oxide, lead oxide, chromium oxides and the like.

The most effective use of the treated inorganic pigments, and especially pigmentary titanium dioxide, is in thermoplastic formulations, though the resulting hydrophobic surface of the treated pigment can find uses in powder paints and similar systems. Any intended use for the thermoplastic is acceptable for present purposes such as molded articles, sheets, laminates, and the like.

A wide variety of thermoplastic binders are well known in the art and are suitable for being pigmented by the treated inorganic pigments of this invention. Illustrative of such binders are the following classes of binders: olefins such as polyethylene, polypropylene, polybutadiene, and the like; vinyls such as polyvinylchloride, polyvinylesters, polystyrene; acrylic homopolymers and copolymers; phenolics; amino resins; alkyds, epoxys, siloxanes, nylons, polyurethanes, phenoxys, polycarbonates, polysulfones, polyesters optionally chlorinated, polyethers, acetals, polyimides, polyoxyethylenes, and the like. The foregoing list is merely for illustration and not by way of limitation.

A wide variety of conventional additives may be included in the binder as is necessary, desirable or conventional. Such additives include catalysts, initiators, anti-oxidants, blowing agent, UV stabilizers, organic pigments including tinctorial pigments, plasticizers, leveling agents, flame retardants, anti-cratering additives, and the like.

In practicing the invention, the inorganic pigment may be treated with the treating agent in any conventional fashion. Thus, the inorganic pigment may be coated or surface treated by spraying the treating agent onto the pigment, contacting a solution of the treating agent with the inorganic pigment followed by drying the pigment, or any other technique that is necessary, desirable or convenient. Of importance in this operation, though, is that the final treated inorganic pigment retain a sufficient proportion of the treating agent to provide an effective phosphorous content of at least about 0.02% by weight of the pigment. Conventional finishing operations then may be practiced on the treated inorganic pigment, such as air or steam micronization of pigmentary titanium dioxide, for example.

The treated pigment of this invention is characterized by improving at least the dispersibility of such pigment in the thermoplastic binders in which it is incorporated. Treated titanium dioxide also can have improved pigmentary properties in the thermoplastics into which it is incorporated. Such pigmentary properties include dispersibility in the plastic, viscosity reduction, tint tone, thermal stability, mass tone, and the like.

A significant pigmentary property improvement which can be garnered by the treated $TiO_2$ pigments of this invention is suppression of yellowing in polyolefins, such as, for example, polyethylene, polypropylene and the like. Such yellowing is attributed to the undesirable interaction of the $TiO_2$ pigment with various phenolic anti-oxidants in the presence of air (see Solvick et al, *Control of Yellowing in TiO$_2$-Pigmented HDPE*, Modern Plastics, pages 78–81, 1974). Further, significant improvement in yellowing can be attained by utilizing the phosphorylated polyene treating agents as stabilizers added directly to the polyethylene regardless of the particular type of $TiO_2$ pigment used. Thus, the $TiO_2$ may be untreated, treated with other conventional treating agents, or treated in accordance with this invention, and a significant lessening of yellowing achieved by adding the treating agent to the polyethylene.

Conventional phenolic anti-oxidants typically used in polyethylenes include, for example, alkylated phenols, substituted benzophenones, thiobisphenols, polyphenols, and the like and mixtures thereof. Exemplary anti-oxidants include 2,6-di-tertiary-butyl-para-cresol, 2,2'-methylenebis (4-methyl-6-tertiary-butylphenol), 4,4'-methylenebis (2,6-di-tertiary-butylphenol), 4,4'-thiobis (6-tertiary-butyl-orthocresol), and the like.

The following examples show how the present invention can be practiced, but should not be construed as limiting. In this application all temperatures are in degrees Centigrade, and all percentages and proportions are by weight unless otherwise expressly indicated.

EXAMPLES

In the examles, the following test procedures were used:

1. Polyethylene Yellowing (PE Yellowing): With a two roll mill set to 30 psig steam pressure and an opening between the rolls of 5 mils, 300 grams of low density polyethylene is transferred to the mill and allowed to warm up for 10 minutes. The warmed polyethylene (approximately 135° C.) then was banded and the mill opening reset to 20 mils with a roll speed of 48 rpm. The $TiO_2$ pigment to be tested (12 grams) is added to the polyethylene and worked up for 5 minutes followed by the addition of 0.30 grams of SANTANOX-R anti-oxidant (a dialkyl phenol sulfide, Monsanto, St. Louis, Mo., SANTANOX being a registered trademark), and one more minute of work up. The mill then is continued to run for another 5 minutes without manual work up of the polyethylene. Finally, the mill opening is readjusted to 30 mils and the mill run for 30 seconds.

The pigmented polyethylene is removed from the mill and two 2"×3" sections cut out therefrom. The sections then are pressed between Ferro plates using a 30-mil thick shim stock. A one minute preheat and two minute press time at 300°–310° F. at 8000 psi is used. The pressed polyethylene section then is cooled in the press for 2 minutes at 8000 psi. Optical measurements on the section are taken using a Hunter Color Difference Meter and the y and b values recorded. The standard pigment used, unless otherwise expressly indicated, in all examples was a $TiO_2$ pigment which had been treated with about 0.3% by weight of a silicone oil. The %y and $\Delta$b values are based on the standard pigment compared to the pigment being evaluated. Values of %y greater than 100% are desirable with increasing values indicative of improved pigmentary properties. Lower $\Delta$b values are desirable and negative $\Delta$b values are preferred with decreasing values indicative of improved pigmentary properties.

2. PVC Dispersion: The PVC resin compound is prepared in the same manner as described for the polyethylene preparation at 143°–144° C. using a two roll mill. The samples, however, were not pressed. The sample sheets (9 inches square) then are examined visually (at 1.5× magnification) and the number of specks and streaks (surface imperfections) recorded. These specks are evidently caused by pigment agglomerates in the PVC sheets. Per square inch, 0–0.3 specks indicates a good uniform dispersion of $TiO_2$ in the PVC samples, 0.31–0.61 indicates an average dispersion, 0.61–0.90 indicates a low uniformity of dispersion, and above 0.91 is totally unacceptable.

The PVC sheets were formulated from the following ingredients:

| | |
|---|---|
| PVC Resin (Geon EP 103 polyvinylchloride resin, B. F. Goodrich Chemical Co.) | 8lb. 13 oz. |
| DOP, bis-2-(ethylhexyl) phthalate (a plasticizer) | 2lb. |
| M&T Thermolite 31 stabilizer (M&T Chemicals, Inc.) | 100 gr. |
| Stearic Acid (lubricant) | 20 gr. |
| Carbon Black Paste 50% Claremont K-961 Hi-Jet Black (Claremont Polychemical Corp.) 50% DOP | 8 gr. |
| $TiO_2$ pigment | 8 gr. |

The PVC formulation consists of 800 grams of the black polyvinylchloride compound and 8 grams of $TiO_2$ pigment.

3. BFR (Blown Film Rating): Polyethylene (low density) pigmented with $TiO_2$ is put through a conventional 3 zone screw-extruder at 270° F. in the first zone, 300° F. in the second zone, and 320° F. in the third zone. The hot pigmented polyethylene then is air blown to a film thickness of 0.5 to 1.0 mil. The blown films then are visually rated on a 1 to 5 scale with 1 being a good rating and 5 being a poor rating usually caused by holes in the polyethylene film.

4. DOP Dispersion: To 250 ml of DOP, bis-2-(ethylhexyl) phthlate, is added 50 grams of $TiO_2$ and this dispersion blended at high in an Osterizer blender for 3 minutes. The dispersion then is cooled to room temperature (about 25° C.) and the viscosity (centiposes) measured with a Brookfield viscometer.

EXAMPLE I

The phosphorylated polyene treating agents were prepared by reacting various unsaturated fatty acid mixtures with $PCl_3$ in methylene chloride solvent in the presence of a Friedel-Crafts catalyst, $AlCl_3$. Some samples were subjected to alcoholisis with methyl alcohol and then to hydrolysis to form phosphorylated fatty acid esters and other samples were processed under conditions to retain the carboxyl group of the fatty acids. Also, some samples were recovered from solvent by vacuum distillation while other samples were distilled at high temperature at atmospheric pressure. All samples herein were prepared according to the processes outlined by Jungerman et al. *J. Org. Chem.*, 27, 606 (1962), which is incorporated herein expressly by reference.

The feed fatty acid mixtures used in the foregoing preparations were commercially available SYLFAT 95 (Samples 2–8) and SYLFAT 496 (Samples 1 and 9–20) tall oil fatty acids (SYLFAT is a registered trademark of SYLVACHEM CORPORATION, Jacksonville, Florida). These fatty acid mixtures are about half linoleic acid or an isomer thereof and about an equal amount of oleic acid. The following data on these tall oil fatty acids is taken from their product data sheets.

| | SYLFAT 496 | SYLFAT 95 |
|---|---|---|
| SPECIFICATIONS | | |
| Acid No. | 193 min. | 193 min. |
| Unsaponifiables | 1.9% | 1.9% max. |
| Free Rosin Acids | 1.15% max. | 2.7% max. |
| Color (Gardner) | 3 max. | 3 max. |
| TYPICAL PROPERTIES | | |
| Saponification No. | 198 | 197 |
| I.V. | 130 | 132 |
| Specific Gravity 25°/25° C. | 0.899 | 0.895 |
| Flash Point (C.O.C.) | 400° F. | 395° F. |
| Fire Point (C.O.C.) | 430° F. | 430° F. |
| Titer | 4° C. | 4° C. |
| TYPICAL COMPOSITION | | |
| Fatty Acids | 98.0% | 95.8% |
| Rosin Acids | 1.0% | 2.5% |
| Unsaponifiables | 1.0% | 1.7% |

The treating agents then were applied by a syringe to pigmentary titanium dioxide at various concentrtions and the treated pigments steam micronized to an average particle size of about 0.19 to 0.21 microns.

The thus-prepared $TiO_2$ pigments were subjected to a variety of tests in order to evaluate their pigmentary properties in thermoplastics formulations. The novel $TiO_2$ pigments performed slightly better than the standard treated pigment in tests on Thermal Stability, Tint Strength, and Mass Tone. The following table details the results of the other tests conducted. Samples Nos. 1–12 use the phosphorylated fatty acid ester treating agent, samples 13–15 use the acid form of the treating agent, and samples 16–20 were processed by high temperature distillation of solvent from treating agent rather than the vacuum distillation technique used for samples 1–15.

TABLE I

| Sample No. | %P in Treating Agent | Concentration Applied wt-% | PVC Specks/in² | BFR | DOP Viscosity (cps) | PE Yellowing %Y | PE Yellowing Δb |
|---|---|---|---|---|---|---|---|
| 1 | 6.36 | 0.3 | 0.09 | 2.5 | — | 101.0 | −0.7 |
| 2 | 7.12 | 0.17 | — | 3 | — | — | — |
| 3 | 7.12 | 0.17 | 1.00 | 2 | — | 100.4 | +0.2 |
| 4 | 7.12 | 0.3 | 0.01 | 3.5 | — | — | — |
| 5 | 7.12 | 0.33 | — | 3 | — | — | — |
| 6 | 7.12 | 0.33 | 0.41 | 2 | 250 | 99.9 | 0.0 |
| 7 | 7.12 | 0.67 | 0.0 | 1.5 | — | 99.8 | −0.8 |
| 8 | 7.12 | 0.67 | 0.01 | 1.5 | 208 | 100.1 | −1.0 |
| 9 | 7.12 | 0.17 | 0.21 | 4 | — | 100.9 | +0.3 |
| 10 | 7.12 | 0.33 | 0.0 | 1.5 | 225 | 101.2 | −0.5 |
| 11 | 7.12 | 0.67 | 0.0 | 1.0 | 198 | 101.7 | −1.3 |
| 12 | 7.12 | 5.00 | — | 2.5 | 100 | 101.2 | −0.7 |
| 13 | 5.15 | 0.5 | — | 2.5 | 244 | 100.1 | +0.1 |
| 14 | 5.15 | 1.0 | — | 2.0 | 203 | 101.0 | −0.5 |
| 15 | 5.15 | 1.5 | — | 1.0 | 187 | 101.2 | −1.1 |
| 16 | 7.25 | 0.17 | — | 5 | 520 | 100.4 | +0.6 |
| 17 | 7.25 | 0.33 | — | 5 | 280 | 100.4 | +0.4 |
| 18 | 7.25 | 0.67 | — | 2 | 220 | 101.9 | −0.5 |
| 19 | 7.25 | 1.00 | — | 1.5 | 200 | 102.8 | −1.4 |
| 20 | 7.25 | 1.33 | — | 1.5 | 160 | 102.9 | −1.8 |
| Control | 0 | 0 | 1.23 | 5 | 1500 | 98.9 | +0.8 |

The above-tabled results clearly demonstrate the ability of the phosphorylated polyene treating agents in improving the pigmentary properties of $TiO_2$ pigment. It should be noted that the PVC test on sample 6 may be inaccurate in view of the results reported with the other samples. Still, these results show the relationship in phosphorus content of the treating agents to improved pigmentary properties of the $TiO_2$. Broadly, as the concentration of treating agent increases, so does the pigmentary properties of the $TiO_2$ improve. A comparison of samples 2-8, 9-12, 13-15, and 16-20 show this to be correct. Also, the particular polyene, functional groups on the polyene, and processing conditions used for preparing the treating agent displayed little, if any, affect on the effectiveness of the treating agent.

It should be noted that the precise amount of phosphorus retained on the $TiO_2$ is indeterminate because the exact structure of a Friedel-Crafts prepared phosphorylated polyene is unknown in the art. Analysis of the carbon residue on samples of the treated pigments permitted the approximate phosphorus content retained on the $TiO_2$ to be calculated. These results indicated that approximately 0.02% phosphorus content on the $TiO_2$ was required in order for the treating agents to be effective.

EXAMPLE II

Another series of phosphorylated polyene treating agents are SYLVACOTE K pigment dispersing agents (SYLVACOTE K is a trademark of SYLVACHEM CORPORATION), which are phosphorylated fatty acid derivatives. The typical physical properties of the SYLVACOTE K agents are given below:

| | |
|---|---|
| Acid Number | 146-153 |
| Color (Gardner) | 3-5 |
| Viscosity (Gardner-Holt) | G-I at 25° C. |
| Specific Gravity | 1.049-1.056 at 25° C. |
| Titer | 0° C. |
| Phosphorus Content | 10-11% |

These treating agents advantageously can be prepared from tall oil fatty acids or vegetable oil fatty acids. The SYLVACOTE K agents used in this example were derived from SYLFAT 496 (samples Nos. 1-13) and SYLFAT 96 (samples Nos. 14-21). The following data is taken from the product data sheet for SYLFAT 96.

| SPECIFICATIONS | |
|---|---|
| Acid No. | 196 min. |
| Unsaponifiables | 1.3% max. |
| Free Rosin Acids | 1.3% max. |
| Color (Gardner) | 4 max. |
| TYPICAL PROPERTIES | |
| Saponification No. | 198 |
| IV | 131 |
| Specific Gravity 25°/25° C. | 0.899 |
| Flash Point (COC) | 359° F. |
| Fire Point (COC) | 430° F. |
| Titer | 4° C. |
| TYPICAL COMPOSITIONS | |
| Fatty Acids | 97.6% |
| Rosin Acids | 1.2% |
| Unsaponifiables | 1.2% |

The treating agents were applied to $TiO_2$ pigment, steam micronized, and evaluated according to the procedure described in Example I. The following table details the results of the evaluations.

*TABLE II

| Sample No. | % P in Treating Agent | Effective % P on TiO₂ | BFR | DOP Viscosity (Cps) | PE Yellowing %Y | PE Yellowing Δb |
|---|---|---|---|---|---|---|
| 1 | 10.07 | .0490 | 1.5 | 170 | 101.8 | −0.3 |
| 2 | 10.07 | .0575 | 1.0 | 165 | 101.7 | −0.5 |
| 3 | 10.09 | .0564 | 1.0 | 165 | 101.2 | −0.5 |
| 4 | 10.09 | .0666 | 1.0 | 163 | 101.3 | −0.7 |
| 5 | 10.81 | .0529 | 1.5 | 175 | 101.2 | −0.4 |
| 6 | 10.81 | .0680 | 1.0 | 165 | 101.5 | −0.8 |
| 7 | 10.86 | .0590 | 1.0 | 173 | 101.8 | −0.9 |
| 8 | 10.86 | .0704 | 1.5 | 163 | 102.2 | −0.9 |
| 9 | 11.04 | .0558 | 1.5 | 167 | 101.5 | −0.8 |
| 10 | 11.14 | .0625 | 1.0 | 173 | 101.4 | −0.7 |
| 11 | 11.14 | .0743 | 1.0 | 163 | 101.7 | −1.0 |
| 12 | 11.51 | .0615 | 2.0 | 175 | 101.4 | −0.6 |
| 13 | 11.51 | .0869 | 1.5 | 155 | 101.9 | −1.2 |
| 14 | 10.11 | — | 1 | 170 | 101.6 | −0.6 |
| 15 | 10.11 | — | 2 | 168 | 102.0 | −0.9 |
| 16 | 10.35 | — | 2 | 310 | — | — |
| 17 | 10.35 | — | 1 | 280 | — | — |
| 18 | 10.35 | — | 1 | 270 | — | — |
| 19 | 10.35 | — | 1 | 230 | — | — |
| 20 | 11.15 | — | 1 | 165 | — | — |

*TABLE II-continued

| Sample No. | % P in Treating Agent | Effective % P on TiO$_2$ | BFR | DOP Viscosity (Cps) | PE Yellowing % Y | Δb |
| --- | --- | --- | --- | --- | --- | --- |
| 21 | 11.15 | — | 1 | 158 | — | — |

FOOTNOTE:
The proportion of phosphorus on pigment was not recorded for Samples 14-21. PE yellowing tests were not conducted on Samples 16-21, but the BFR values for these samples are believed to be a sensitive and reliable measurement indicative of the optical performance of the sample being tested.

The effectiveness of the treating agents is clearly demonstrated by the above-tabled results. One interesting relationship shown above is that there is a near-linear relationship between the effective amount of phosphorus on the TiO$_2$ and polyethylene yellowing. Thus, adjustment of the amount of treating agent used and the phosphorus content of the treating agent permits achievement of pre-determined Δb values with a fair degree of accuracy.

EXAMPLE III

The treating agents used in this example were diphosphonic acid esters of para-methane which compounds are disclosed in commonly-assigned co-pending application Ser. No. 925,165 (cited above). The particular agents used are believed to have the following structures:

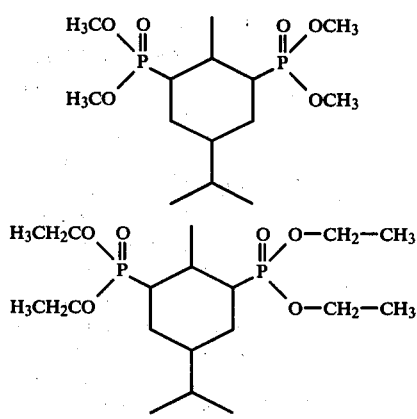

Sample 1 used the methoxy-derivative (I) and samples 2 and 3 used the ethoxy-derivative (II). TiO$_2$ pigment was treated, micronized, and evaluated in the same manner previously described. The control is an untreated TiO$_2$ pigment.

TABLE III

| Sample No. | Treating Agent Concentration | BFR | PE Yellowing % Y | Δb |
| --- | --- | --- | --- | --- |
| 1 | 0.67 | 2 | 101.6 | −1.1 |
| 2 | .30 | 2 | 100.6 | −0.4 |
| 3 | .60 | 1.5 | 101.6 | −1.1 |
| Control | — | 5 | 99.7 | +0.5 |

Again, these treating agents are shown to be effective in treating TiO$_2$ pigments for improving pigmentary properties of the treated pigments. These particular terpene-based treating agents do not possess long-term heat-stability as expected from terpenoids, but do provide the treated TiO$_2$ with very acceptable vinyl mass tone and vinyl tint strength.

EXAMPLE IV

Comparative tests were conducted in order to test the phosphorylated polyenes as additives or stabilizers for suppression of polyethylene yellowing. Polyethylene yellowing is an undesired interreaction postulated to occur between the TiO$_2$ pigment and phenolic anti-oxidants added to the polyethylene. The additives tested were SYLVACOTE K agent and a commercial additive WESTON-618, (Borg-Warner Chemicals, Parkersburg, W. Va., WESTON-618 being a registered trademark) which is a di(stearyl)pentaerythritol diphosphite. The phenolic anti-oxidant used was SANTONOX-R.

The tests consisted of a series where no additive was present and a series where each of the foregoing additives was present. The tests utilized an untreated pigment (run 1), a silicon oil surface treated TiO$_2$ pigment (0.3 wt.-percent silicone oil) (run 2), and a pigment treated with about 0.6 wt.-percent of SYLVACOTE K agent (run 3). The standard used was each pigment in polyethylene without any additive being present. The polyethylene contained 3% by weight of TiO$_2$ pigment. The results of the tests are set forth in the following table.

TABLE IV

| | ADDITIVES | | | | | |
| --- | --- | --- | --- | --- | --- | --- |
| RUN NO. | SYLVACOTE K (0.1%) | | W-618 (0.1%) | | W-618 (0.25%) | |
| | % Y | Δb | % Y | Δb | % Y | Δb |
| 1 | 103.2 | −4.7 | 104.3 | −4.1 | 104.3 | −5.1 |
| 2 | 102.0 | −0.5 | 101.8 | −0.7 | 102.0 | −0.7 |
| 3 | 100.3 | −0.2 | 100.5 | −0.5 | 100.8 | −0.5 |

The foregoing results demonstrate the effectiveness of the phosphorylated polyenes as anti-yellowing agents in polyethylene. The results are especially good for an untreated pigment and are quite good for a conventionally treated pigment (run 2). In evaluating the results for the phosphorylated polyene treated TiO$_2$ pigment, it should be borne in mind that the mere use of this novel pigment in polyethylene without an additive compared to the use of an untreated pigment in polyethylene without an additive tested to yield a %Y of 104.0 and a Δb of −5.4. Thus, the mere use of the novel pigment garners substantial improvement in improving the pigmentary properties of TiO$_2$ in polyethylene with additional anti-yellowing improvement garnered by addition of the phosphorylated polyene as an additive to the polyethylene.

EXAMPLE V

The procedure of Example IV was repeated for a series of TiO$_2$ pigments (4.0 percent by weight pigment loading in the low density polyethylene): an untreated pigment (run 1, the standard upon which all measurements are based), a TiO$_2$ pigment treated with 0.3% silicone oil, and a pigment treated with about 0.6% of SYLVACOTE K agent. The results are displayed below.

TABLE V

| | SYLVAKOTE K | | | | | | | |
| --- | --- | --- | --- | --- | --- | --- | --- | --- |
| RUN NO. | 0% | | 0.05% | | 0.10% | | 0.50% | |
| | % y | Δb | % y | Δb | % y | Δb | % y | Δb |
| 1 | 100 | 0 | 105.5 | −3.3 | 106.4 | −4.5 | 105.7 | −3.9 |
| 2 | 102.3 | −3.9 | 103.6 | −4.6 | 103.5 | −4.5 | 104.1 | −4.0 |

TABLE V-continued

| RUN NO. | SYLVAKOTE K | | | | | | | |
|---|---|---|---|---|---|---|---|---|
| | 0% | | 0.05% | | 0.10% | | 0.50% | |
| | % y | Δb | % y | Δb | % y | Δb | % y | Δb |
| 3 | 105.9 | −4.1 | 106.8 | −5.6 | 106.7 | −5.3 | 106.3 | −4.6 |

While the phosphorylated polyene treated pigment of run 3 provides the best suppression of polyethylene yellowing, these results demonstrate that the phosphorylated polyene additive effectively suppresses polyolefin yellowing for an untreated pigment and for a conventionally treated pigment.

EXAMPLE VI

The treating agent was a phosphorylated linoleic acid prepared from 99+% purity linoleic acid and dimethyl hydrogen phosphite and had the following analysis:

| | |
|---|---|
| Phosphorus (wt-%) | 13.18% |
| Color (Gardner) | <1 |
| Viscosity (Gardner-Holt, 254) | V+ |
| Acid Number | 182.6 |

The treating agent was applied to $TiO_2$ pigment at four different concentrations, steam micronized, and evaluated in a manner similar to the procedure of Example I. A control $TiO_2$ pigment which had not been treated was tested also. The results obtained are displayed in Table VI:

TABLE VI

| Sample No. | Treating Agent Concentration (wt-%) | Effective % P on $TiO_2$ | BFR | DOP Viscosity (Cps) | PE Yellowing | |
|---|---|---|---|---|---|---|
| | | | | | % Y | Δb |
| 1 | 0.1 | 0.0115 | 3.5 | 440 | 99.9 | +0.3 |
| 2 | 0.2 | 0.0182 | 2 | 320 | 99.9 | +0.2 |
| 3 | 0.4 | 0.0422 | 2 | 210 | 100.1 | −0.3 |
| 4 | 0.67 | 0.0744 | 1.5 | 198 | 100.4 | −0.7 |
| Control | — | — | 5 | 660 | 99.9 | +0.7 |

The foregoing tabulated results clearly show that the treating agent made from a polyunsaturated compound (a diunsaturated fat-forming acid) is an effective treating agent for inorganic pigments. Previous Examples herein utilized a mixture of monounsaturated and diunsaturated fat-forming acids for synthesis of the treating agents. This Example shows that the phosphorylated treating agent synthesized from a polyene alone is an effective treating agent.

It should be noted that the instrument used to measure PE yellowing in this Example is not the same instrument used in the previous Examples and, thus, a direct comparison of the results between this Example and the previous Examples is not possible. One direct comparison test using a 0.67% SYLVACOTE K treated $TiO_2$ pigment sample yielded a Δb value of −1.2 on the instrument used in the previous Examples and −0.7 on the instrument used in this Example.

EXAMPLE VII

In order to further demonstrate the need for a polyene for synthesizing the treating agent and to amplify on the results of Example VI, two additional treating agents were prepared by the Friedel-Crafts procedure reported in Example I. The first treating agent candidate was prepared from methyl oleate (Sample 1) and the second from SYLFAT 496 (Sample 2). As reported in Example I, SYLFAT 496 is a mixture of oleic and linoleic acids in about equal proportions. The results of these tests are reported in Table VII.

TABLE VII

| Sample No. | % P in Treating Agent | Treating Agent Concentration (wt-%) | PVC Specks/$in^2$ | BFR |
|---|---|---|---|---|
| 1 | 6.66 | 0.3 | >1.23 | — |
| 2 | 6.36 | 0.3 | 0.07 | 2 |

The above-tabulated results show that the proportion of phosphorus in the treating agent alone does not determine the effectiveness of the treating agent. In fact, Sample 1 prepared from a monounsaturated compound contained more phosphorus than did the inventive treating agent of Sample 2. The treating agent candidate of Sample 1 provided apparently no improvement in the physical and optical properties of the $TIO_2$ pigment. The inventive treating agent Sample 2 had a proportion of phosphorus of less than one phosphoryl group per double bond on the average of the fat-forming acid mixture from which it was prepared, yet provided effective physical and optical improvements to the $TiO_2$ on which it was coated.

EXAMPLE VIII

A sample of a cadmium pigment (CADMOLITH Orange, CADMOLITH is a registered trademark of SCM Corporation, Baltimore, Md.) was treated with 0.6% by weight of SYLVACOTE K treating agent (derived from SYLFAT 96). The treated cadmium pigment and an untreated control cadmium pigment each were subjected to the PVC Dispersion test in order to compare their dispersibility in the PVC resin. A visual examination of the PVC sheet during the two roll mill operations and of the final PVC sheet showed that the treated cadmium pigment dispersed more evenly and quicker than the untreated cadmium pigment as by actual count there were less specks in the PVC sheet containing the treated cadmium pigment than in the PVC sheet containing the control pigment.

I claim:

1. Process for treating an inorganic pigment which comprises applying to said pigment a treating agent comprising the reaction product of a phosphorylating agent and a polyolefin in a proportion to provide at least about 0.02% phosphorus content by weight of said pigment.

2. Process of claim 1 wherein said pigment is titanium dioxide having an average particle size of about 0.1 to 0.5 microns.

3. Process of claim 1 wherein said polyolefin is a fat-forming acid having at least diunsaturation.

4. Process of claim 3 wherein said fat-forming acid is a $C_{10}$–$C_{22}$ fat-forming acid.

5. Process of claim 1 wherein said polyolefin is a fat-forming acid ester having at least diunsaturation.

6. Process of claim 5 wherein said fat-forming acid ester is a $C_1$–$C_{10}$ aliphatic of said fat-forming acid.

7. Process of claim 5 wherein said fat-forming acid ester is an ester of a $C_{10}$–$C_{22}$ fat-forming acid.

8. Process of claim 1 wherein said polyolefin is a mixture of a polyene and a monoene.

9. Process of claim 1 wherein said polyolefin is a mixture of a polyunsaturated fat-forming acid or its ester, and a monounsaturated fat-forming acid or its ester and/or a saturated fat-forming acid or its ester.

10. Process of claim 1 wherein said phosphorylated polyolefin is a phosphorylated mixture of oleic acid or its ester and linoleic acid or its ester.

11. Process of claim 1 wherein said inorganic pigment is pigmentary titanium dioxide.

12. Inorganic pigment coated with a treating agent comprising the reaction product of a phosphorylating agent and a polyolefin, said coated pigment containing a sufficient proportion of said phosphorylated polyene to provide at least about 0.02% phosphorus content by weight.

13. The inorganic pigment of claim 12 comprising pigmentary titanium dioxide having an average particle size of about 0.1 to about 0.5 microns.

14. The pigmentary titanium dioxide of claim 13 wherein said phosphorus content is between about 0.02% and about 0.1%.

15. The pigmentary titanium dioxide of claim 14 which also contains a phosphorylated monounsaturated fat-forming acid or its ester and.

16. The pigmentary titanium dioxide of claim 15 wherein all of said fat-forming acids are $C_{10}$ to $C_{28}$ fat-forming acids.

17. The pigmentary titanium dioxide of claim 14 which also contains a phosphorylated monounsaturated fat-forming acid or its ester and a saturated fat-forming acid.

18. The pigmentary titanium dioxide of claim 17 wherein all of said fat-forming acids are $C_{10}$ to $C_{28}$ fat-forming acids.

19. The pigmentary titanium dioxide of claim 13 wherein said reaction product contains by weight between about 6% and 12% phosphorus.

20. The pigmentary titanium dioxide of claim 13 wherein said polyolefin is a polyunsaturated fat-forming acid or its ester.

21. Process for suppressing yellowing in thermoplastic polyolefins containing a phenolic anti-oxidant and titanium dioxide pigment which comprises adding to said polyolefin an effective amount of a treating agent comprising the reaction product of a phosphorylating agent and a polyolefin.

22. Process of claim 21 wherein said reaction product is coated on said pigment.

23. Process of claim 22 wherein said reaction product provides at least about 0.2% phosphorus by weight of said pigment.

24. Process of claim 21 wherein said reaction product is dispersed in said polyolefin.

25. Process of claim 24 wherein said reaction product provides at least about 0.5% by weight of said thermoplastic.

26. Process of claim 21 wherein said polyolefin is a $C_{10}$–$C_{28}$ fat-forming acid or its ester.

27. The process of claim 21 wherein said thermoplastic polyolefin is polyethylene or polypropylene.

* * * * *

UNITED STATES PATENT AND TRADEMARK OFFICE
CERTIFICATE OF CORRECTION

PATENT NO. : 4,209,430
DATED : June 24, 1980
INVENTOR(S) : Leon Weber

It is certified that error appears in the above—identified patent and that said Letters Patent is hereby corrected as shown below:

Column 2, line 45, "925,165" should read -- 924,165 --.

Column 2, lines 45 and 46, "now abandoned" should read -- now U. S. Patent No. 4,183,879, issued January 15, 1980 --.

Column 4, line 47, "6-tertiary-butyl-orthocresol" should read -- 6-tertiary-butyl-ortho-cresol --.

Column 4, line 55, "examles" should read - examples --.

Column 5, line 68, after "at high" insert -- speed --.

Column 9, line 26, "925,165" should read -- 924,165 --.

Column 13, line 23, delete "and".

Signed and Sealed this

Ninth Day of December 1980

[SEAL]

*Attest:*

SIDNEY A. DIAMOND

*Attesting Officer*  *Commissioner of Patents and Trademarks*